United States Patent [19]

Klatt

[11] Patent Number: 5,099,610
[45] Date of Patent: Mar. 31, 1992

[54] LIVESTOCK BARRIER

[76] Inventor: Wayne Klatt, 2566 McCaig Crescent SE., Medicine Hat, Canada, AB T1B 1B4

[21] Appl. No.: 605,516

[22] Filed: Oct. 30, 1990

[51] Int. Cl.⁵ ............................................... E06B 9/52
[52] U.S. Cl. ........................................ 49/58; 49/137; 256/14
[58] Field of Search ............... 49/58, 131; 404/6; 256/14, 17

[56] References Cited

U.S. PATENT DOCUMENTS

| | | | |
|---|---|---|---|
| 696,153 | 3/1902 | Warren et al. | 256/17 |
| 2,024,063 | 12/1935 | Roper | 49/131 |
| 2,539,214 | 1/1951 | Warner | 256/14 |
| 2,710,173 | 6/1955 | Manuel et al. | 256/14 |
| 2,744,728 | 5/1956 | Melchert et al. | 256/14 |
| 2,800,304 | 7/1957 | Alsburg | 256/14 |
| 2,846,194 | 8/1958 | Wells | 256/14 |
| 3,193,239 | 7/1965 | Monroe | 248/566 |
| 3,256,637 | 6/1966 | Torrey | 49/131 X |
| 3,491,480 | 1/1970 | Neckel et al. | 49/131 X |
| 3,491,482 | 1/1970 | Wedekind | 49/131 |
| 3,516,202 | 6/1970 | Justice | 49/131 |
| 3,623,267 | 11/1971 | Williams | 49/131 |
| 3,744,185 | 7/1973 | Patterson | 49/131 |
| 3,748,782 | 7/1973 | Reynolds | 49/131 |
| 4,138,095 | 2/1979 | Humphrey | 404/6 X |
| 4,708,515 | 11/1987 | Davies | 49/58 X |
| 4,844,423 | 7/1989 | Combs | 256/14 X |

Primary Examiner—Gary L. Smith
Assistant Examiner—Jerry Redman
Attorney, Agent, or Firm—Bailey & Hardaway

[57] ABSTRACT

A portable livestock barrier is disclosed which includes a rigid metal panel of open grid construction that is arranged to rest in a normal operational position that is parallel to the ground to thus form a raised grid which livestock will not cross but which can be flattened to the ground against a resilient return force when a vehicle is driven across it. The rigid metal panel is supported by a resilient suspension which permits the panel to tilt with respect to its normal operating position and to be forced flat against the ground when the weight of a vehicle is applied to it. The livestock barrier does not require a pit or special surface preparation for its installation. It may be quickly installed on any solid, relatively level surface. The unit is transportable and it can be readily moved from one location to another without disassembly.

14 Claims, 3 Drawing Sheets

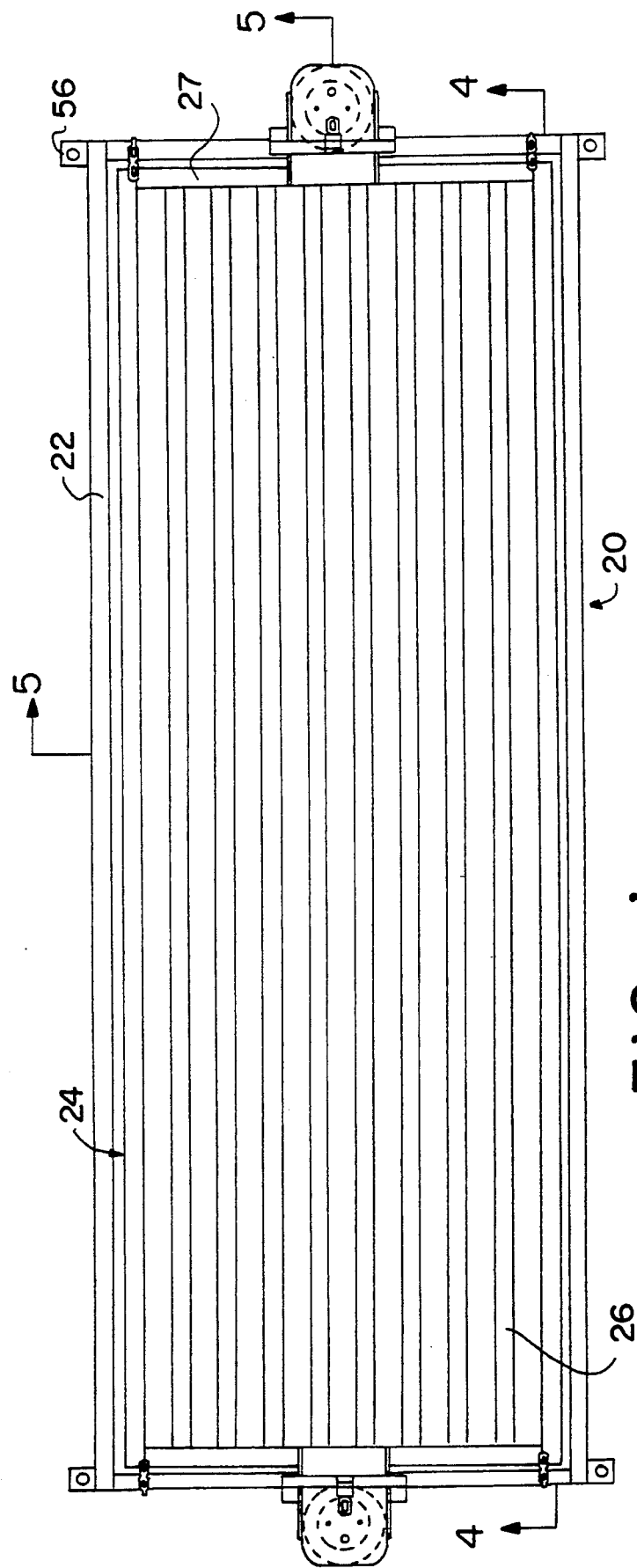

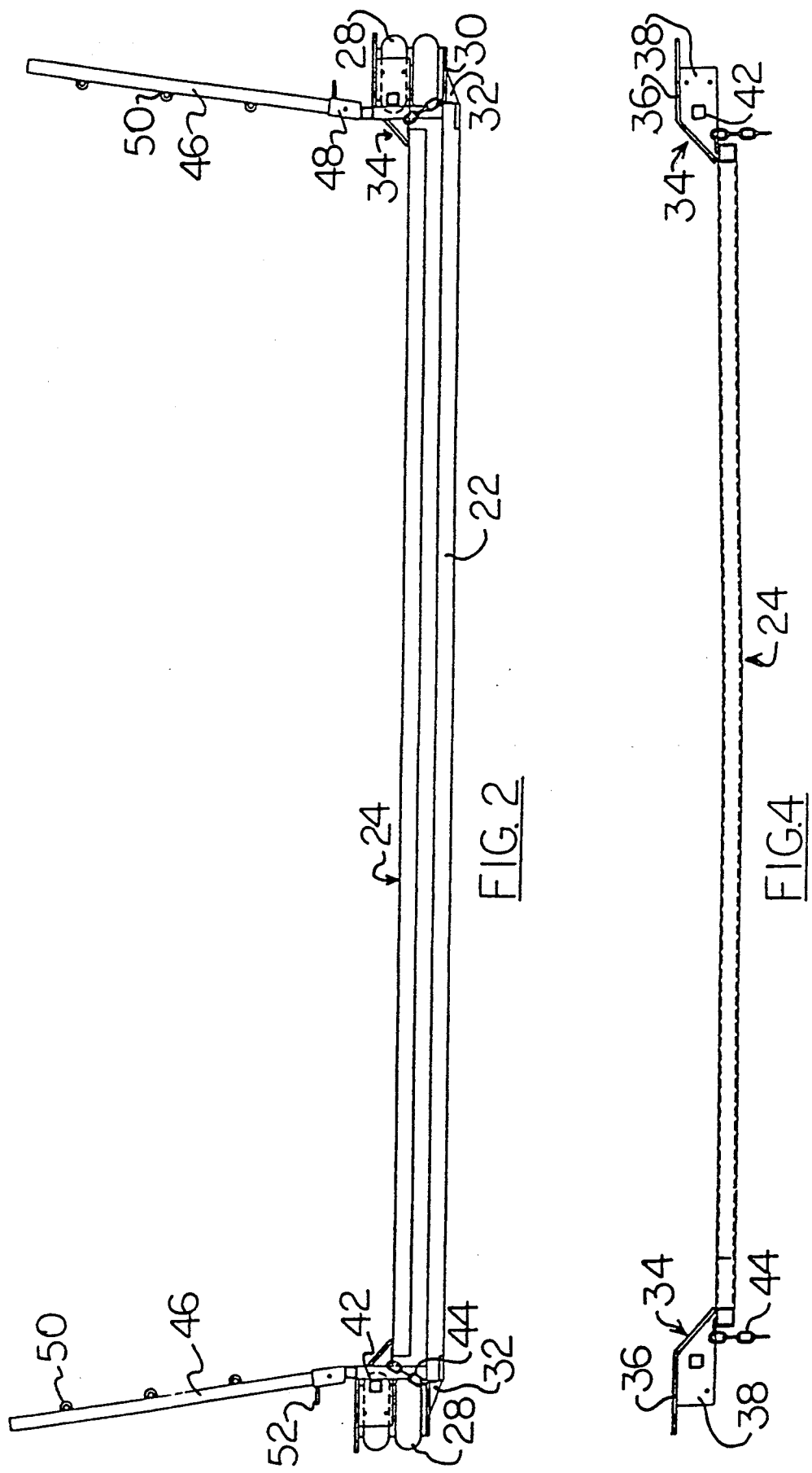

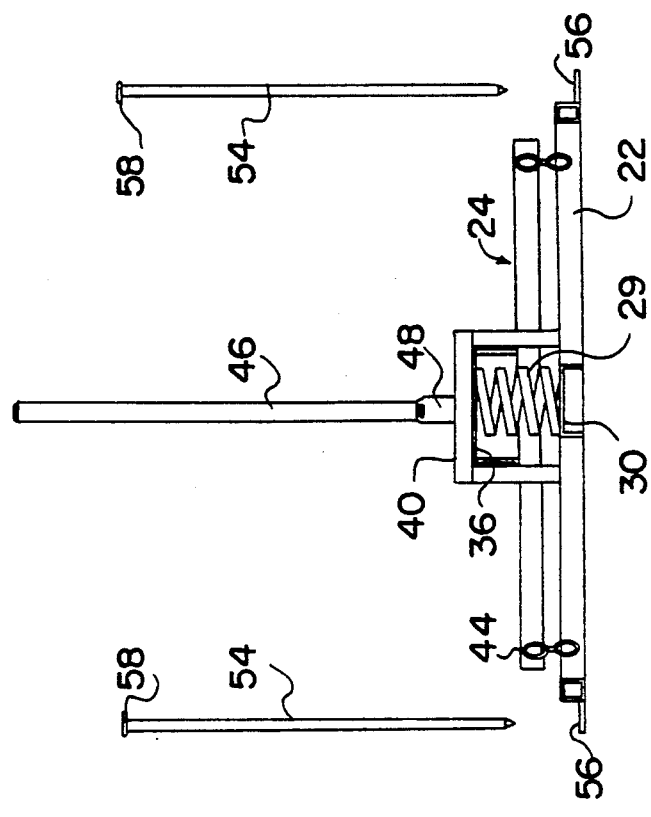
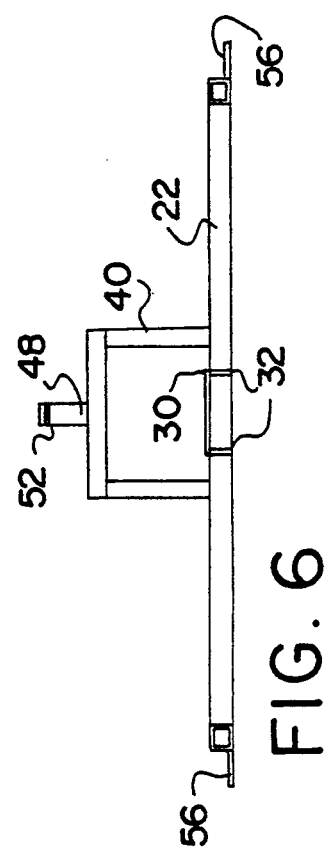
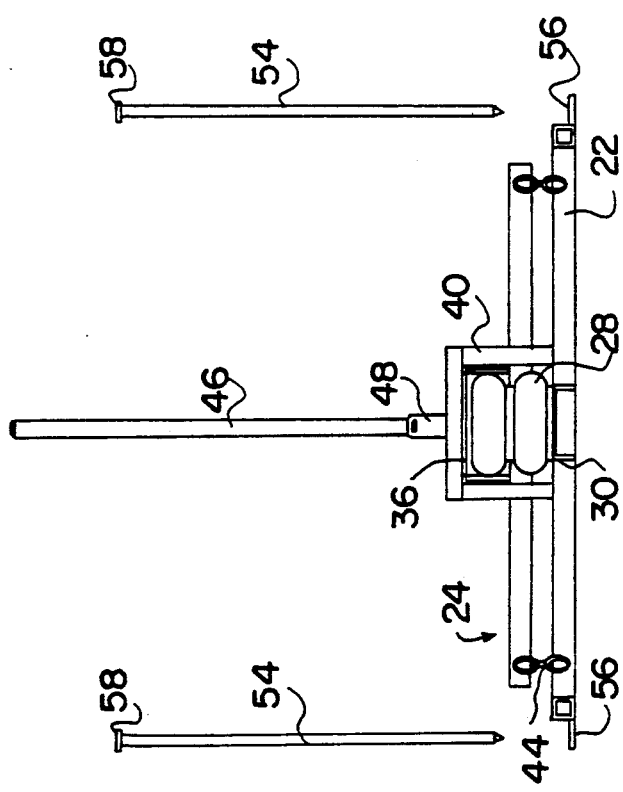
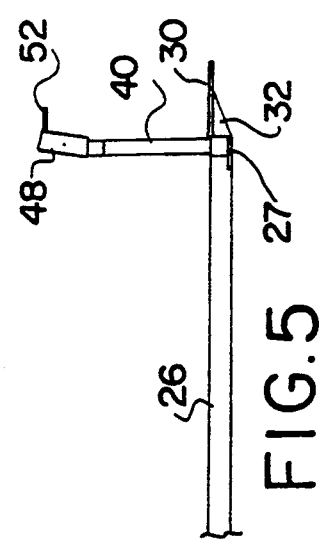

LIVESTOCK BARRIER

The present invention relates to livestock control systems and in particular to a novel portion livestock barrier which permits vehicular and pedestrian access to areas in which livestock, such as cattle etc. are confined.

BACKGROUND OF THE INVENTION

Traditionally, livestock have been contained by gates and the like which generally must be manually operated and are difficult to maneuver through, especially if an unassisted driver must move heavy equipment through a gate in an enclosure used to confine a large group of animals. The "cattle grid", sometimes called a "Texas Gate", was invented to permit unattended free access to an enclosure while confining animals. The conventional cattle grid comprises an open grid construction which is installed over an open-topped, generally rectangular pit in the ground. The pit, which is commonly about a half meter deep, is excavated in a path or roadway in place of a traditional gate. The spaces in the open grid construction are preferably wider than the length of the hooves of the animals to be confined. Animals are therefore unable or afraid to maneuver their way across the barrier, while vehicles and people are readily capable of crossing the grid over the top of the pit.

Although the conventional cattle grid provides distinct advantages over gates and the like, there are several drawbacks which render it undesirable in certain situations. First, a large pit must be excavated, the walls retained, the pit drained and the excavated earth disposed of. The construction of a cattle grid is therefore an expensive and time-consuming operation. In addition, once the structure is built, it is permanent in nature. In order to remove it, the open grid construction must be removed, the pit refilled and the surface of the road or path repaired. Access to the area is, of course, impossible during either the construction or removal of traditional cattle grid.

In order to overcome the disadvantages of the traditional cattle grid, pitless cattle grid structures were invented to contain livestock while permitting ready access to an area by vehicular and pedestrian traffic. Two known alternatives are described in U.S. Pat. No. 4,708,515 entitled STOCK BARRIER which issued to Davies on Nov. 24, 1987 and French Patent Application Number 2,573,621 which was filed by Grospiron on Nov. 29, 1984.

The STOCK BARRIER to Davies describes a cattle grid which comprises a plurality of rigid metal panels of open grid construction that are arranged to lie in a normal operational position at an angle to the ground to thus form a pair of back-to-back ramps across which stock will not cross but which can be flattened to the ground against a resilient return force when a vehicle is driven across. Although this apparatus represents an improvement in some respects over the traditional cattle grid, it has several disadvantages which detract from its desirability. First, the structure is not portable. It requires a pair of opposed sturdy support posts which must be set in concrete or the like to support the structure, so it is relatively expensive to install. Second, in order to permit the opposed side edges of the open metal work panels to flatten against the ground when a vehicle embarks the stock barrier, a very firm level surface must be provided. This means that the cattle grid must be installed over an asphalt or concrete surface and runners must be installed under certain portions of the grid to provide for its reliable operation. Finally, because of the construction of the cattle grid, it is potentially hazardous for vehicles with a very long wheelbase as the V-shaped grid could be pulled upward by the return springs when the front wheels leave the grid, causing damage to the undercarriage of the vehicle due to contact between the undercarriage and the top of the V-shaped grid.

French Application Number 2,573,621 describes a barrier for livestock with cloven hooves. The barrier comprises a rectangular array of Y-shaped sculpted plates which are interlocked to form a planar grid having equally spaced Y-shaped projections which prohibit such animals from crossing the array in one direction due to pain inflicted in their distal hoof ligament by the projections. The advantage of the structure is that it theoretically permits the one-way passage of animals across the barrier. It also permits vehicular traffic over the barrier in either direction. The disadvantage of the structure is that the interlocking plates are preferably set in a bed of wet concrete. The barrier is, therefore, a permanent structure which requires a relatively lengthy and expensive installation. Besides, it only prevents the circulation of animals with cloven hooves and then in only one direction. It further appears to be an expensive alternative in that each element of the array must be precisely manufactured to relatively exacting tolerances.

Certain industries such as the oil exploration industry, for example, often require access to fenced cattle ranges for an indefinite term. In order to facilitate access to a fenced area while minimizing the risk of having cattle escape from the area, cattle grids of the traditional pit type are generally installed. Such installations contribute to operating expenses of exploration and generally slow the progress of opening new areas. There, therefore, exists a need for a reusable, portable livestock barrier which is quickly and easily installed with a minimum of time and effort.

It is an object of the present invention to overcome the problems of known prior art cattle grids.

It is a further object to present invention to provide a livestock barrier which is readily portable.

It is yet a further object of present invention to provide a livestock barrier which does not require special support surface preparation for its installation and use.

SUMMARY OF THE INVENTION

In accordance with the present invention, a livestock barrier is provided which comprises:
- a flat open grid construction across which livestock will not pass when it is supported in a normal operational position above and parallel with the ground;
- a frame for supporting the flat open grid construction; and
- resilient means disposed between the frame and the flat open grid construction for supporting the flat open grid construction in the normal operational position so that it is tiltable with respect to said position and depressable by the weight of a vehicle to lie flat against the ground when the vehicle crosses the barrier.

The livestock barrier in accordance with the invention includes a flat open grid construction which is supported above and parallel with the ground surface.

The open grid is preferably a rectangular structure constructed from straight rigid parallel spaced-apart members. When such a structure is supported in a normal operations position above and parallel with the ground, farm livestock refuse to cross it because they fear leg injury due to the height and spacing of the open grid. The open grid is supported in its operational position by a resilient suspension which is affixed to a simple frame that preferably surrounds the outer edges of the grid. In accordance with a preferred embodiment of the invention, the open grid is supported by either of an opposed pair of vehicle suspension airbags of the type used in the suspension system of semitrailer tractors or an opposed pair of compression coil springs of the type used in pickup truck suspension systems.

BRIEF DESCRIPTION OF THE DRAWINGS

The preferred embodiment of the invention will now be explained by way of example only and with reference to the following drawings wherein:

FIG. 1 is a plan view of a portable livestock barrier in accordance with the invention;

FIG. 2 is a side elevational view of the livestock barrier shown in FIG. 1;

FIG. 3 is an end elevational view of the livestock barrier shown in FIG. 1;

FIG. 4 is a cross-sectional view of the flat open grid construction shown in FIG. 1, the cross-section being taken along lines 4—4 of FIG. 1;

FIG. 5 is a partial cross-sectional view of the supporting frame for the open grid construction shown in FIG. 1, the partial cross-section being taken at lines 5—5 of FIG. 1;

FIG. 6 is an end view of the supporting frame shown in FIG. 1; and

FIG. 7 is an end elevational view of an alternate construction of the livestock barrier shown in FIG. 1.

DETAILED DESCRIPTION OF THE PREFERRED EMBODIMENT

As shown in FIG. 1 of the drawings, the portable livestock barrier in accordance with the invention generally referred to by reference 20, includes an outer support frame 22 and a flat rectangular open grid construction 24 which serves as a livestock barrier. The open grid 24 is preferably assembled from square steel box beam stock in order to maximize rigidity while minimizing weight. Pipe, I-beam, H-beam, channel and other rigid materials made from steel or aluminum may alternatively be used to assemble the open grid. The actual structure of the open grid is not important so long as it provides a surface which, when elevated above the ground, inhibits livestock from attempting to traverse it. The preferred construction, as shown in FIG. 1, is a rectangular grid of parallel spaced-apart box beams 26 which are welded on their opposite ends to a box beam header 27. The outer support frame 22 is likewise preferably constructed of steel box beam stock which is welded together to form rectangular frame. Experimentation has shown that 2"×2" High Stress Steel (HSS) extruded box-section beam provides adequate strength while minimizing the weight of the structure.

FIGS. 2, 3 and 7 illustrate the portable livestock barrier 20 in its normal operational position wherein the open grid construction 24 is supported in a raised position parallel with the ground. A resilient support is required so that the grid may be forced flat onto the ground by a vehicle passing over the barrier. The preferred resilient support is one of a suspension airbag unit 28 of the type used for the suspension system of semitrailer tractor bodies and a compression coil spring 29 of the type used in the suspension systems of pickup trucks (see FIG. 7). One airbag unit known to be satisfactory for this application is an unit manufactured by the EUCLID* Company, Part No. E2B09-200. One coil spring known to be satisfactory for this application is a spring manufactured by the MOOG Company, Part No. CC213. Reference made hereinafter to the airbag unit 28 applies equally to compression coil spring 29. The airbag 28 is affixed on its base to a flat shelf 30, constructed of steel plate which is welded to outer frame 22 and reinforced by a pair of triangular brackets 32. Each suspension airbag 28 is in turn affixed on its top end to a support bracket, generally referred to by reference 34 (see FIG. 4) which includes a top plate 36 and two trapezoidal side plates 38 which are welded to the opposite longitudinal edges of the top plate 36 as may be seen in FIG. 3. Support bracket 34 is welded along its inner edge to the top surface of the open grid 24.

The support bracket rides inside a control frame 40 which prevents the longitudinal and lateral displacement of the open grid 24. Control frame 40 is likewise welded from steel box beam stock and loosely surrounds the support bracket 34. The support bracket 34 is further provided with an opposed pair of short laterally projecting box beam sections 42 which ride up and down along the outer side edges of control frame 40 to prevent the longitudinal displacement of the open grid 24.

As is apparent from the above description, the open grid 24 is supported on a horizontal pivot formed by the opposed suspension airbags 28. The open grid 24 is free to tilt, within restricted limits, about that horizontal pivot. Short lengths of chain 44, or similar flexible connectors, are welded or otherwise affixed to each corner of open grid 24 and a corresponding point on an end of the support frame 22 to limit the tilting movement of the open grid 24. The chains 44 thereby prevent the open grid 24 from damaging the undercarriage of a vehicle when the vehicle embarks or disembarks an edge of the open grid 24, because a free edge of the open grid 24 cannot tilt higher than the normal operating position of the open grid.

The portable livestock barrier in accordance with the invention further includes two posts 46 (see FIG. 2) for connecting fencing material to the ends of the barrier. The posts are likewise preferably constructed from steel box beam stock and simply slide into a box beam bracket 48 of larger cross-section that is welded to the top of each control frame 40 (see FIG. 6). Each post is equipped with three or more islets 50 which are conveniently half chain links or the like, welded to the post. A similar link 52 on bracket 48 provides an additional attachment point for fencing (FIG. 5).

In use, the portable livestock barrier is transported to a location where it is required and a relatively level installation site is selected. If the area is fenced, the fence must be cut in order to accommodate the barrier. If the surface is not level, minimal levelling must be accomplished before the barrier is installed. If the installation is to be permanent or long-term, a solid or woven synthetic plant growth barrier should be installed before the livestock barrier is set in its working position to prevent grass and weeds from growing up through the structure.

Once a surface is prepared, the barrier is simply set in position and secured to the ground with anchor rods 54 (see FIGS. 3 and 7) driven through the holes in anchor brackets 56 (see FIG. 1). Anchor rods 54 are conveniently concrete rebar with a large flat washer 58 welded onto their top ends, or a similar substitute which has adequate strength to secure the outer support frame 22 to the ground. The length of the anchor rods 54 will depend on the surface to which the portable livestock barrier is to be anchored. For loose sandy soil, anchor rods of up to 4 feet (1.2 meters) are recommended. For hard compacted surfaces, anchor rods which are much shorter in length may be adequate.

After the portable livestock barrier has been positioned and anchored to the ground, the airbags 28 are inflated with enough air pressure to raise the open grid construction 24 to its normal operating position shown in FIGS. 2 and 3. Generally about 8 lbs. of air pressure per square inch is required, however, the actual pressure required depends upon the size and weight of the open grid 24. The airbags 28 have an advantage over coil springs, for instance, because they are infinitely adjustable over a predetermined range in the return force they provide. Airbags may therefore support practically any size of open grid 24. Coil springs, on the other hand, are by nature fixed in their resiliency and must be balanced with the weight of the open grid construction 24. Although the airbags are preferred for their adjustability, coil springs are preferred for their economy and with minimal experimentation a suitably sized spring can readily be found for any given size of open grid construction.

In use, a vehicle approaches either side of the portable livestock barrier 20. As the vehicle is driven onto the outer support frame 22, the edges of the tires engage a side of the open grid 24. The pressure of the advancing tires pivots that edge of the open grid 24 downwards to the ground. As the vehicle advances, the opposed airbags 28 (FIG. 3) or coil springs 29 (FIG. 7) are compressed and the open grid 24 is forced flat against the ground. When the vehicle's advancing tires approach the opposite side of open grid 24, the free side of the grid once more pivots upwardly until it is restrained by chains 44. The chains 44 prevent the open grid from pivoting high enough to contact the undercarriage of the vehicle and thereby cause damage. The preferred operational position of the open grid 24 is approximately 4 inches (10 cm) above the ground. Experiments have shown that a 4 inches (10 cm) elevation is adequate to prevent livestock from crossing the barrier while being low enough to permit practically any vehicle to cross safely.

Those skilled in the art will also readily appreciate that minor modifications to control frame 40 and support bracket 34 would permit the use of a tension spring in lieu of airbags 28 or compression coil springs 29. The means for supplying the open grid 24 is not important so long as it is supported in its normal operational position so that it may be tilted with respect to that position and forced flat against the ground when a vehicle crosses it.

It will be readily understood by those skilled in the art that changes and modifications may be made to the preferred embodiment described hereinbefore without departing from the spirit of the invention whose scope is intended to be limited solely by the appended claims.

The embodiments of the invention in which an exclusive property or privilege is claimed are defined as follows:

1. A livestock barrier comprising:
   a flat open grid construction across which livestock will not pass when it is supported in a normal operational position above and parallel with the ground;
   a frame for supporting the flat open grid construction;
   resilient means disposed between the frame and the flat open grid construction for supporting the flat open grid construction in a normal operational position so that it is tiltable with respect to said position and depressible by the weight of a vehicle to lie flat against the ground when the vehicle crosses the barrier; and
   lengths of chain having opposite ends which are respectively connected to the frame for supporting the flat open grid construction and a peripheral edge of the flat open grid construction so that an edge thereof cannot be tilted higher than the normal operational position.

2. A livestock barrier comprising:
   a flat rectangular open grid construction across which livestock will not pass when it is supported in a normal operational position above and parallel with the ground, said open grid having opposed side and end edges;
   a rectangular frame for supporting the open grid, said frame surrounding an outer periphery of the open grid and including brackets located at each corner for receiving anchor rids to secure the frame to the ground;
   compressible resilient means for supporting the open grid in a normal operational position so that the open grid is tiltable with respect to said position and depressible to lie flat against the ground when a vehicle crosses the barrier, said compressible resilient means being disposed between a support bracket affixed to a center point of each end edge of the open grid and a shelf affixed to a center point of each end of the rectangular frame; and
   flexible connectors having opposite ends, which ends are respectively connected to each corner region of the open grid and the frame to limit the tilt of the open grid so that and edge thereof cannot be tilted higher than the normal operational position.

3. The livestock barrier as recited in claim 2 wherein the compressible resilient means comprise two suspension airbags of the type used in the suspension systems of semitrailer tractor bodies.

4. The livestock barrier as recited in claim 2 wherein the compressible resilient means comprise two compression coil springs.

5. The livestock barrier as recited in claim 2 wherein the flexible connectors comprise short lengths of chain.

6. The livestock barrier as recited in claim 2 wherein the frame for supporting the open grid further includes a control frame which loosely surrounds the flat shelf and the support bracket to prevent the longitudinal and lateral displacement of the open grid with respect to the frame.

7. The livestock barrier as recited in claim 2 wherein the compressible resilient means comprise two compression coil springs.

8. A portable livestock barrier which requires no special preinstallation preparation of a surface where the barrier is required for inhibiting the migration of livestock thereover, comprising:

a flat open grid construction across which livestock will not pass when it is supported in a normal operational position above and substantially parallel with the surface, said grid having opposed sides and opposed ends;

a frame for supporting the flat open grid construction, which frame surrounds the grid;

compressible resilient means for supporting the grid construction in the normal operational position above and substantially parallel with the ground, the compressible resilient means being affixed on a bottom end to the frame and on a top end to the grid at an approximate midpoint of respective ends of the grid so that the grid construction is tiltable with respect to the normal operational position and depressible by the weight of a vehicle to lie against the ground and to resiliently respond to its initial position when said vehicle has passed; and at least two flexible connectors having opposite ends, a first end of the connectors being affixed to the frame and an opposite end of the connectors being affixed to the grid construction to limit the tilt of the grid construction so that an edge thereof cannot be tilted higher than the normal operational position.

9. The livestock barrier as recited in claim 8 wherein the compressible resilient means comprise two suspension airbags of the type used in the suspension systems of semitrailer tractor bodies.

10. The livestock barrier as recited in claim 8 wherein the compressible resilient means comprise two compression coil springs.

11. The livestock barrier as recited in claim 8 wherein the flexible connectors comprise short lengths of chain.

12. A portable livestock barrier which requires no special preinstallation preparation of a surface where the barrier is required for inhibiting the migration of livestock thereover, comprising:

a flat rectangular open grid construction across which livestock will not pass when it is supported in a normal operational position above and substantially parallel with the ground, said grid construction including a bracket which extends outwardly from a center point of opposite ends thereof;

a rectangular frame for supporting the grid construction, which frame surrounds the grid construction and includes a shelf that extends in a complementary relationship with the bracket on the grid construction, the frame further including means for securing the frame to the surface;

resilient compressible means disposed between the shelf on the frame and the bracket on the grid construction for supporting the grid construction in the normal operational position so that it is tiltable with respect to said position and depressible by the weight of a vehicle against the ground and to resiliently respond to its initial position when said vehicle crosses the barrier;

a control frame affixed to the frame for supporting the grid construction, which control frame loosely surrounds the bracket to inhibit the lateral and longitudinal displacement of the grid with respect to the frame; and at least one flexible connector affixed to each side of the grid construction to limit the tilt thereof so that an edge of the grid construction cannot be tilted above the normal operational position.

13. The portable livestock barrier as recited in claim 12 wherein the compressible resilient means comprise two suspension airbags of the type used in the suspension systems of semitrailer tractor bodies.

14. The livestock barrier as recited in claim 12 wherein the flexible connector comprises short lengths of chain.

* * * * *